Dec. 27, 1960     L. T. FIKE     2,966,335
TIRE SPREADER

Filed March 25, 1959     4 Sheets-Sheet 1

INVENTOR.
LOUIS THOMAS FIKE
BY *Fulwider Mattingly Huntley*
*Attorneys*

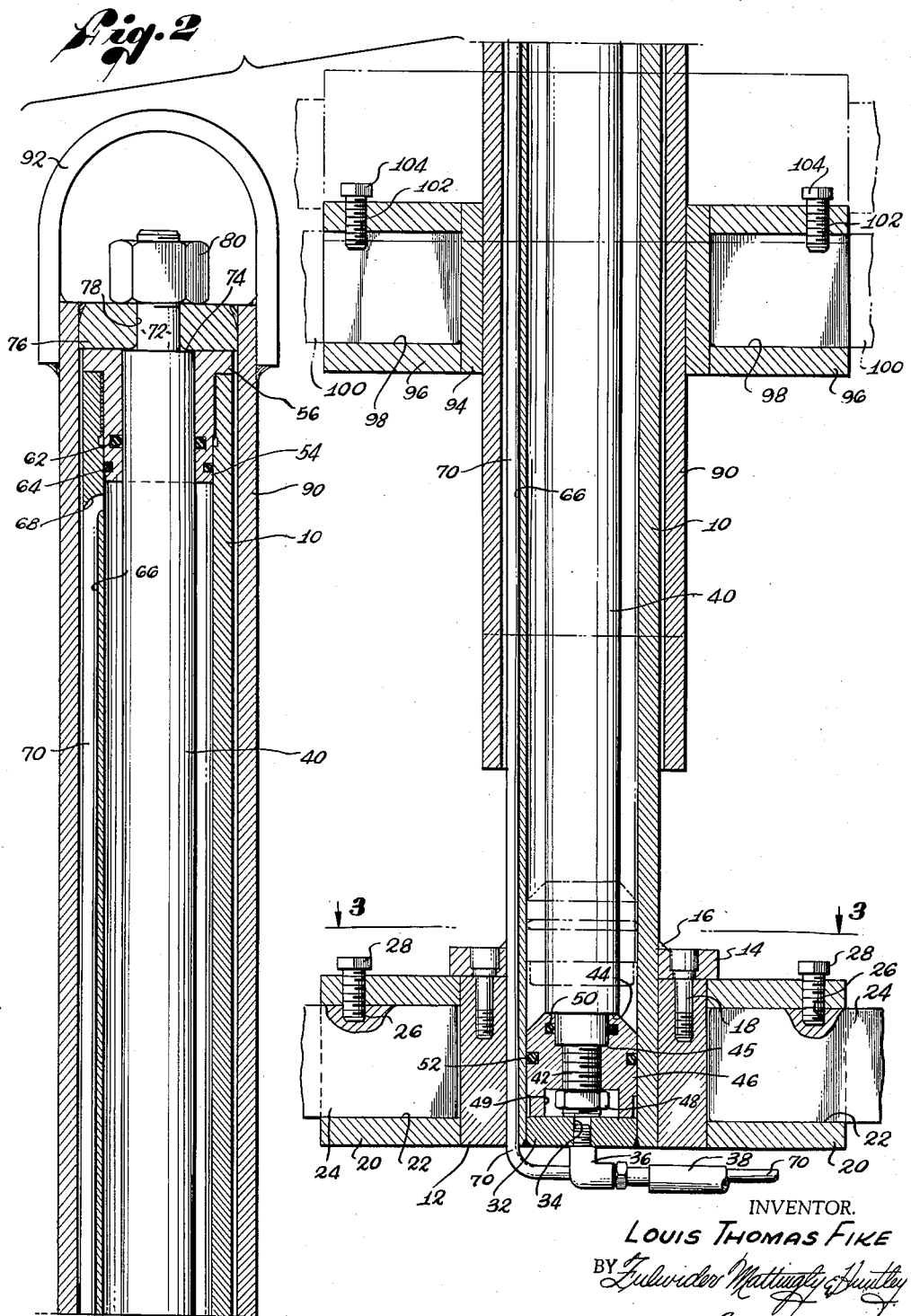

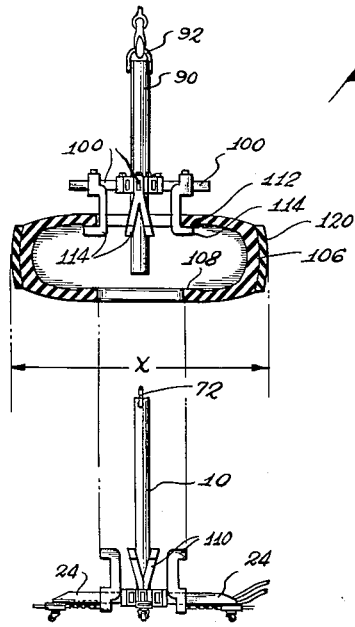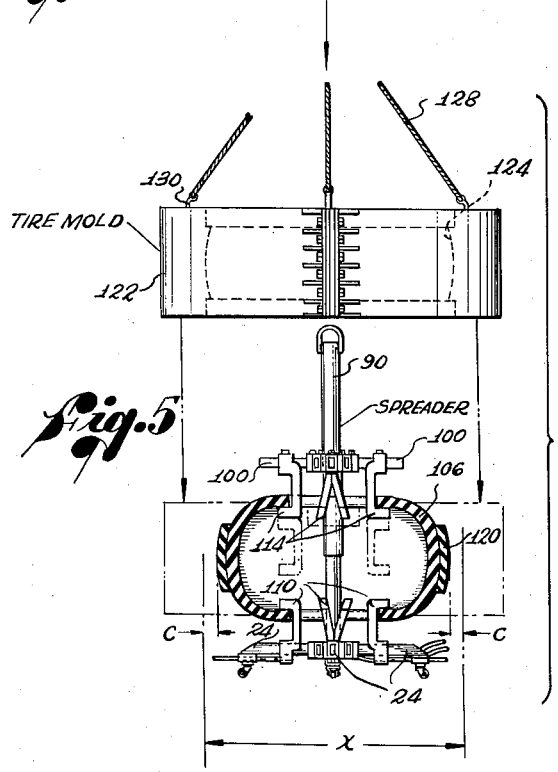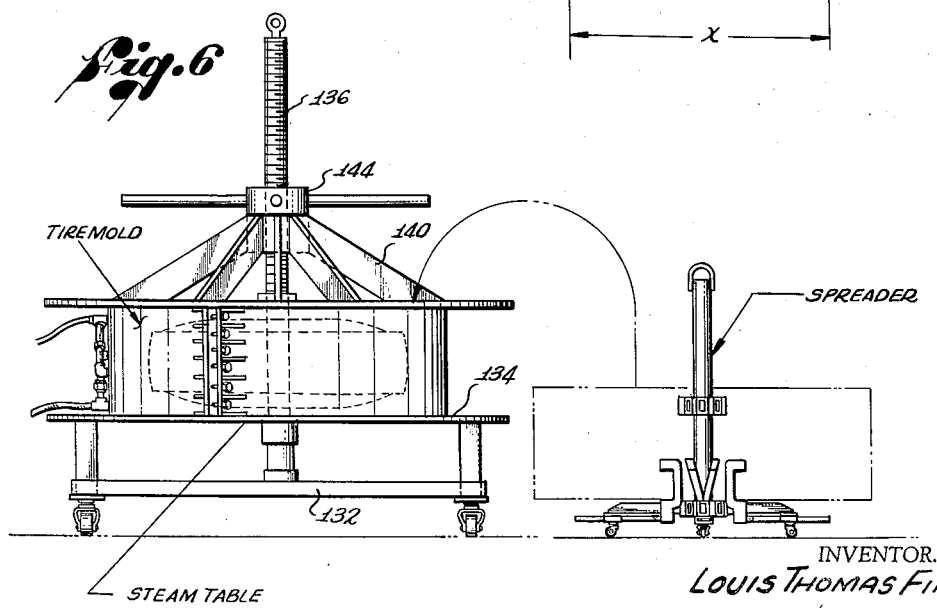

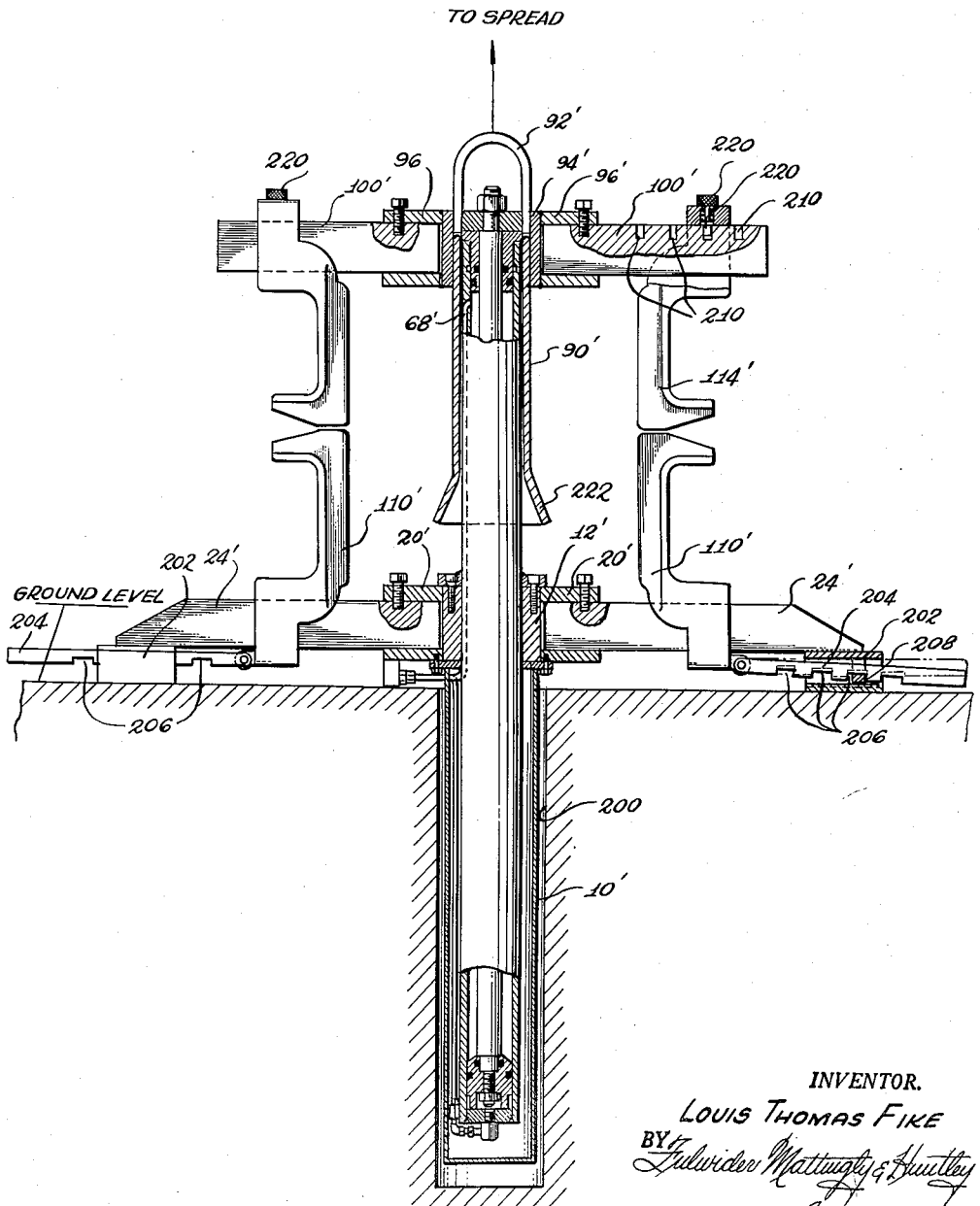

United States Patent Office

2,966,335
Patented Dec. 27, 1960

2,966,335

TIRE SPREADER

Louis Thomas Fike, 1623 Nadeau St., Los Angeles, Calif.

Filed Mar. 25, 1959, Ser. No. 801,926

25 Claims. (Cl. 254—50.3)

My present invention relates to apparatus for spreading the beads of a tire apart so that the tire can be readily inserted into and removed from a tire mold or band, and otherwise handled during capping and treading operations, and it relates particularly to a hydraulically actuated, reversible tire spreader adapted to alternatively both open and close the beads of the tire, rather than just opening the beads of the tire as in conventional tire spreaders.

Conventional, prior art tire spreaders are hydraulically actuated to open the beads of a tire, thereby reducing the overall diameter of the tire so that the tire can be capped. Opening of the tire beads permits the tire and cap or tread to be placed in a tire mold or band having a diameter that is substantially smaller than the diameter of the tire casing. Then, these prior art spreaders are released while the tire is in the mold, to obtain the molding pressure for a compression cure, and the spreader remains released and inoperative until the tire is cured in the mold, at which time the spreader is again operated to open the beads of the tire so that the hot tire can be removed from the mold.

However, when conventional, prior art tire spreaders are thus used, the hot tire is usually distorted when it comes out of the mold, and thereafter while the tire is cooling. This causes the tire to cool and set in a distorted shape with the beads much farther apart than their normal spacing. This makes the tire difficult to mount on its rim for use of the tire on a vehicle.

In view of this and other problems in connection with prior art tire spreaders, it is an object of my present invention to provide a tire spreader which is selectively hydraulically operable to both open and close the beads of a tire, whereby the beads of the tire may be closed to their natural position during the cooling of the tire after it has been removed from the band. Thus, the tires are cooled in substantially the same shape that they have during actual operation, so that the tires are much easier to mount than tires which have been cured in the usual prior art manner, in a distorted shape with their beads spaced widely apart.

Another object of my present invention is to provide a tire spreader of the character described which will both open and close the beads of a tire, which includes a single, unobstructed post which may be selectively extended or contracted, over which the tire is placed.

A further object of my present invention is to provide a tire spreader of the character described in which the upper portion of the spreader which engages the upper beads of the tire is readily removable from the lower portion of the spreader, whereby said upper portion of the spreader may be engaged by a suitable hoist and removed from the lower portion of the spreader, then moved by the hoist into an operative position over a tire and engaged with the upper bead of the tire, and again moved back into its operative position on the lower portion of the spreader with the tire suspended, to move the tire into its normal operative position on the spreader.

An important object of the present invention is to provide a tire spreader of the character described in which the aforementioned post extends downwardly relative to a shop floor thereby reducing the overhead space necessary for operation.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and as is more particularly pointed out in the appended claims.

In the accompanying drawings, forming a part of my present specification:

Figure 2 is a vertical section in enlarged scale taken along the line 2—2 of Figure 1, illustrating the internal details of construction of said tire spreader;

Figures 4, 5 and 6 show consecutive steps in the operation of said tire spreader; and Figure 7 is a side elevational view taken partly in central vertical cross-section and illustrating a second form of tire spreader embodying my present invention.

Figure 1:
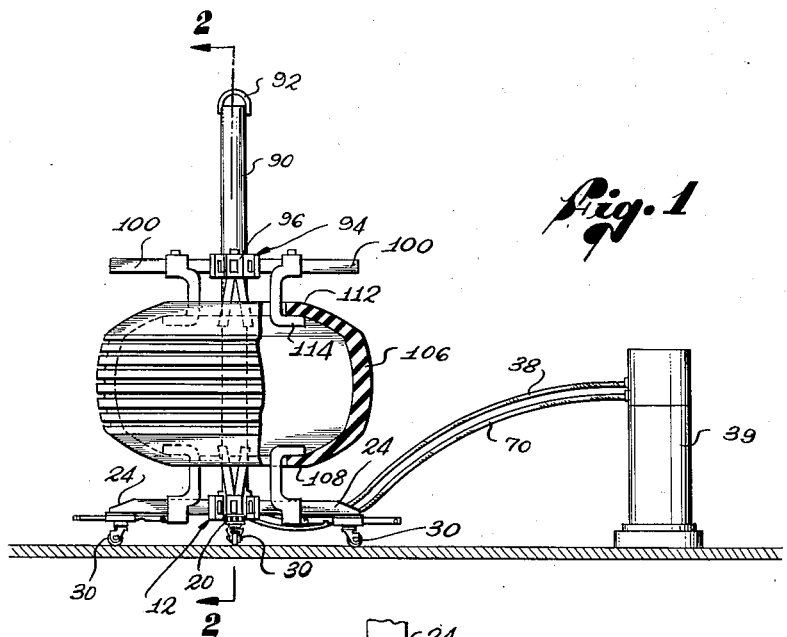
Figure 1 is a side elevation view of a first form of tire spreader embodying my present invention, and upon which a tire is mounted in the spread position.
Figure 3:
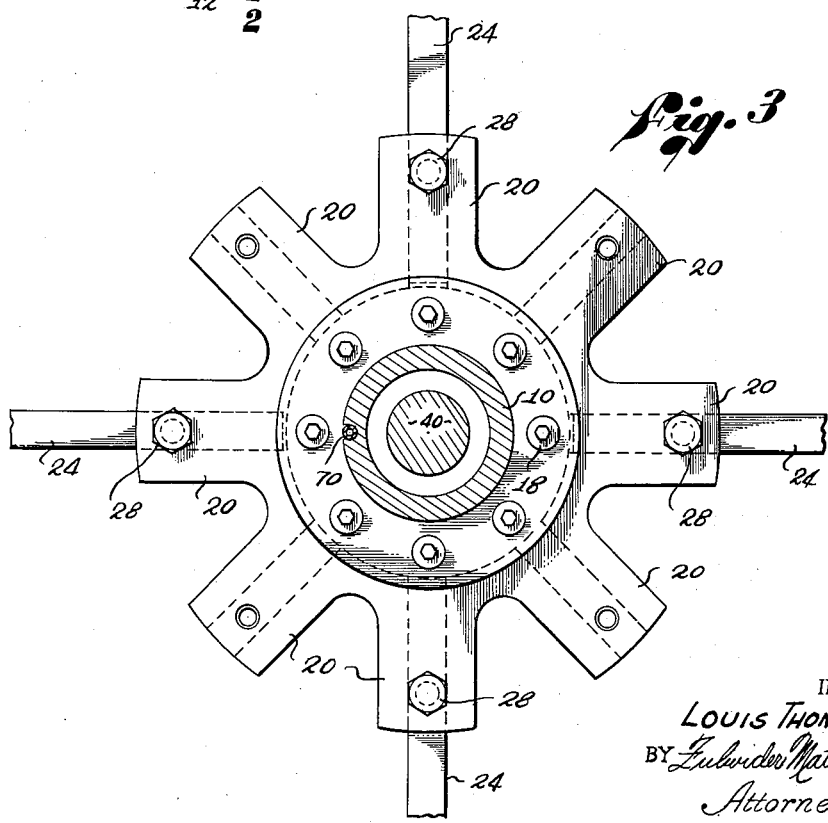
Figure 3 is a horizontal section taken along the line 3—3 in Figure 2, illustrating a preferred means for supporting a tire on said tire spreader.

Referring to the drawings, and particularly Figures 1 through 6 thereof, the first form of tire spreader embodying the present invention includes a vertically disposed, fixed tubular post 10, which has a bottom hub member 12 fitted about its lower end. Hub 12 is secured against upward movement by means of a locking plate 14 disposed about tubular post 10 directly above hub 12. Locking plate 14 is integrally attached to tubular post 10 by suitable means, such as by weld 16. The bottom hub 12 is held in its operative position against locking plate 14 by means of a plurality of cap screws 18 extending through locking plate 14 and threadedly engaged in bottom hub 12.

Bottom hub 12 is provided with a plurality of regularly spaced, radially extending fingers 20 which form integral parts of the hub 12. In the presently preferred embodiment of my invention I have provided eight regularly spaced fingers 20 on hub 12, and in the particular use of my invention shown in the drawings I have actually only employed four of these fingers 20.

Each of the fingers 20 is provided with a radial passage 22 which is preferably rectangular in cross-section. Support bars 24 are adapted to fit into the radial passages 22, the support bars 24 preferably having substantially the same cross-section as the radial passages 22 so that they will seat firmly in the passages 22. It will be noted from the drawings that in the use of my invention there illustrated, I have employed four of the support bars 24, the bars 24 being disposed in alternate fingers 20.

Each of the support bars 24 is provided with a hole 26 drilled downwardly into its upper edge near its inner end for receiving a locking pin 28 which drops down through the upper wall of the respective finger 20 into this hole 26, thus securely locking the support bar 24 in its operative position.

It will be noted that support bars 24 are placed on edge so that they will have their maximum strength for vertical forces which are applied during the operation of the device.

As shown in Figure 1, I have provided a caster 30 at the end of each of the support bars 24 to permit my tire spreader to be readily moved about from place to place. The support bars 24, hub member 12 and casters 30 provide a base that supports the upright post 10.

Referring now particularly to Figure 2 of the drawings, a pressure head member 32 is fitted into the lower end of fixed tubular post 10, the pressure head member 32 being securely locked in this position by welding or other suitable means.

A port 34 is provided through pressure head member 32, with hydraulic fluid being supplied to port 34 through a fitting 36 and a fluid line 38 from a suitable source 39 of hydraulic fluid under pressure.

I provide a piston rod 40 which is centrally disposed within tubular post 10. The base portion 42 of piston rod 40 is provided with two successive reductions in diameter, thus providing downwardly directed shoulders 44 and 45 on piston rod 40 near the lower end thereof.

Piston 46 is mounted over the base portion 42 of piston rod 40, being threadedly engaged with the base portion 42 below shoulder 45. Piston 46 is locked in this position on base portion 42 of piston rod 40 by means of a jam nut 48 disposed in a recess 49 in the bottom of piston 46. O ring 50 is recessed in the upper portion of the bore through piston 46 and bears against the base portion 42 of piston rod 40 above shoulder 45, thus preventing fluid under pressure from seeping between piston 46 and the base portion 42 of piston rod 40.

Another O ring 52 is seated in the outer wall of piston 46 and bears against the inner wall of fixed tubular post 10, to prevent fluid under pressure from passing by the outer wall of piston 46.

Referring now particularly to Figure 2 of the drawings, a collar member 54 is threadedly mounted within the upper end of fixed tubular post 10, collar member 54 having a top flange portion 56 extending outwardly over the top of post 10.

A fluid seal is provided between piston rod 40 and collar 54 by means of an O ring 62 seated in the inner wall of collar 54, and a fluid seal is provided between collar 54 and tubular post 10 by means of an O ring 64 seated in the outer wall of collar 54 below the threaded portion of collar 54.

In order to supply hydraulic fluid under pressure to the inside of tubular post 10 just below collar 54 without introducing any obstruction which would interfere with or prevent the mounting of the tire on the device, I provide a vertical groove 66 along the outside of tubular post 10 from the bottom of post 10 to a position just below collar 54. A passage 68 is provided between the upper end of groove 66 and the inside of tubular post 10.

High pressure tube 70, which is operatively connected to the source 39 of hydraulic fluid under pressure, is disposed along the entire length of groove 66 from the bottom of post 10 up to the passage 68 at the upper end of groove 66, with tube 70 communicating at its upper end with the inside of tubular post 10 through the passage 68.

It will thus be seen that fluid pressure chambers are formed within tubular post 10 both below piston 46 and above piston 46. When the source 39 of hydraulic fluid is actuated to introduce fluid under pressure through fluid line 38 and fitting 36 into tubular post 10 below 46, with fluid pressure at the same time being relieved from tube 70, piston 46 and rod 40 will be moved upwardly.

On the other hand, when fluid under pressure is provided by the source 39 to tube 70, and thence through passage 68 into the inside of tubular post 10 above piston 46, the piston 46 and piston rod 40 will be moved downwardly. During this downward operation fluid pressure is released from line 38.

The upper end of piston rod 40 is provided with a portion 72 having a reduced diameter. This also provides an upwardly directed shoulder 74 on piston rod 40.

A plate member 76 having a central, vertical bore 78 that is slightly larger than upper end 72 of piston rod 40 is disposed over upper end 72 of piston rod 40, resting against the shoulder 74.

A lock nut 80 is removably threadedly mounted on reduced portion 72 at the upper end of piston rod 40 to provide for the removable attachment of piston rod 40 to plate 76.

A sleeve member 90 is slidably mounted over the fixed tubular post 10, and is integrally attached by welding or other suitable means at its upper end to the plate member 76.

A curved gripping member 92 which is open at its sides is welded over the top of sleeve member 90 and integrally attached to the sleeve member 90 by any conventional means, such as by welding. Gripping member 92 is sufficiently spaced from the upper end portion 72 of piston rod 40 to permit nut 80 to be unthreaded from portion 72 of rod 40, whereby a hoist may be selectively attached to gripping member 92 and the entire upper assembly mounted on sleeve member 90 may be lifted off of rod 40 and post 10.

It will be apparent from this construction that with the parts of my invention assembled as in Figure 2, when the source 39 of hydraulic fluid under pressure is actuated to move the piston 46 and piston rod 40 upwardly through fixed tubular post 10, the upwardly directed shoulder 74 near the upper end of piston rod 40 will move the pltae 76, and hence the outer sleeve member 90 upwardly. Conversely, when the source 39 of hydraulic fluid under pressure is actuated to move piston 46 and piston rod 40 downwardly, the nut 80 will move plate 76 downwardly, thus moving the outer sleeve member 90 downwardly.

Integrally mounted on the outside of sleeve member 90 is upper hub member 94 having a plurality of regularly spaced, radially extending fingers 96 integral therewith. In my presently preferred embodiment I employ eight of the radially extending fingers 96 although I have only used four of these in the operation illustrated in the drawings.

Each of the radially extending fingers 96 is provided with a preferably rectangularly cross-sectioned radial passage 98. In the passages 98 of the alternate radially extending fingers 96 I have mounted support bars 100 which fit snugly within the passages 98, and which are fixed in position within the passages 98 by means of downwardly directed holes 102 in the upper edges of support bars 100, into which fit locking pins 104 which pass downwardly through the upper walls of the radially extending fingers 96.

Having described in detail the first form of tire spreader embodying my present invention, I refer now to Figures 4, 5 and 6 for a description of its operation.

Referring now to Figures 4, 5 and 6, the presently preferred method of mounting a tire 106 on the first form of tire spreading device is to first remove lock nut 80 from the upper end 72 of piston rod 40 and then engage gripping member 92 with a conventional movable hoist (not shown). This hoist is manipulated to lift sleeve 90 and its attached mechanism completely off of piston rod 40 and post 10 and move the sleeve 90 over the tire 106 which is lying flat on a horizontal surface. At this time the time the tire will have been provided with a suitable cap or tread 120 that is cemented about the periphery of the tire and is to be vulcanized on to the tire. The sleeve 90 is then lowered substantially coaxially within the confines of the tire 106 and the upper bead 112 of the tire is operatively engaged by upper hook members 114 which are slidably mounted on the upper support bars 100. The hoist is then again manipulated to lift sleeve 90 and its attached mechanism together with tire 106 up over post 10 and piston rod 40. Thereafter, as indicated in Figure 4, the sleeve 90 is lowered over the post 10 and rod 40 until the upper end 72 of the rod 40 passes through the bore 78. The lower bead of tire 106 is then operatively engaged by means of hook members 110 which are slidably mounted on the lower support bars 24. With continued reference to Figure 4, it should be observed that the diameter of the tire 106 with its cap 120 has a normal, relaxed outside diameter represented by the letter X in this figure.

Referring now to Figure 5, the tire 106 is next spread vertically in order that its outside diameter may be reduced sufficiently as to permit a tire mold 122 to encompass the tire. The tire mold 122 may be of conventional construction of the type shown in United States Patent No. 2,030,861, issued to Martin H. Fisher, February 18, 1936. Alternately, a tire mold of the type shown in patent application Serial No. 661,252 filed by me May 23, 1957, may be utilized. In any event the exact construction of such tire mold is outside the scope of the present invention. Such conventional tire mold, however, will include a generally cylindrical tire receiving cavity 124 which is heated as by steam or by electrical current. As indicated in Figure 5, the tire mold 122 may be lifted by means of a conventional hoist (not shown), which is connected to a plurality of lifting cables 128 provided at their lower ends with suitable hooks 130 that engage the upper portion of the tire mold. This arrangement is utilized to first lift the tire mold 122 off a supporting surface and then lower it over the spread-apart tire.

All that is required to spread the tire 106 in the manner shown in Figures 1 and 5 is to actuate the source 39 of hydraulic fluid under pressure to introduce hydraulic fluid through fluid line 38, fitting 36 and port 34 into the lower end of the tubular post 10 below the piston 46 to move the piston 46 and piston rod 40 upwardly thereby moving the connected outer sleeve 90, upper hub member 94, upper support bars 100 and upper hook members 114 upwardly to thereby spread the tire. When the tire has been spread apart its outside diameter will have been reduced from the original distance X of Figure 4 through a distance designated C, C on both sides of the tire in Figure 5. This permits the tire mold 122 to be lowered from its solid outline position of the latter figure into its dotted outline position therein. In this latter position the tire mold 122 encircles the tire 106. The tire may then be released by releasing the hydraulic fluid pressure from line 38 whereby the weight of piston rod 40, outer sleeve member 90 and the attached mechanism will cause upper hook members 114 to become lowered. The resiliency of the tire 106 will then cause the tire to return to its natural position.

Referring now to Figure 6, after the sleeve 90 and its attached mechanism has been lowered to the position indicated in dotted outline in Figure 5, the upper support bars 100 with their hook members 114 will be removed from their respective fingers 96 by withdrawing the lower ends of the locking pins 104 from the confines of the finger passages 98. Additionally, the lower hook members 110 will be slid inwardly along the lower support bars 24 to their position of Figure 6. The tire mold 122 may then be lifted clear of the tire spreader and moved to a conventional steam table 132, i.e. from its dotted outline position of this figure to its solid outline position therein. The exact construction of this steam table 132 is not included in the scope of the present invention. In general, however, it includes a wheeled platform 134 upon which is coaxially formed an upright post or center bolt 136. The latter is formed at its upper portion with external threads. The center bolt 136 vertically slidably supports an upper clamp member 140. This upper clamp member 140 is urged downwardly against the upper surface of the tire mold 122 by means of a nut member 144 threadably carried by the center bolt 136. With this arrangement, the tire mold 122 will be secured in place upon the steam table 132. The mold cavity 124 of the tire mold 122 is then heated so as to vulcanize the tread 120 to the tire 106 in a conventional manner.

At the conclusion of the vulcanizing operation the tire mold 122 may be returned to its original position upon the tire spreader. Thereafter, it is highly advantageous to apply compressive forces to the tire beads 108 and 112 to close the beads of the tire while the tire is being cooled after the tire has been removed from tire mold in order to cause the tire to be cooled and set in its natural, undistorted shape. This may be accomplished by setting the outside of the lower bead 108 of tire 106 on the tops of the lower hook members 110, and by operatively engaging the bottoms of the upper hook members 114 against the top of the upper bead 112 of tire 106. The upper hook members 114 are then moved downwardly to close the beads of the tire by introducing hydraulic fluid under pressure into the upper end of tubular post 10 through fluid line 70. A plurality of cooling hooks (not shown) are then operatively engaged over the beads to hold the beads at their normal separation, and the tire can then be removed from the spreader, by using the hoist again if desired.

It is to be noted that considerably more upward force is required of the aforedescribed tire spreader in order to open the tire beads than is required to close the tire beads in the above described operation of my device. Also, the weight of piston rod 40, outer sleeve 90, and the associated mechanism assists the closing of the tire beads, but opposes the opening of the beads, thus requiring an even greater difference in the upward force over the downward force.

This difference between the required upward and downward forces is compensated for by the difference in piston areas upon which the hydraulic fluid pressure acts. Thus, the upward force is achieved by hydraulic fluid under pressure operating on the entire cross-sectional area of piston 46 from below piston 46. In contrast, the downward force is caused by fluid pressure operating against only the peripheral portion of piston 46 which is disposed radially outwardly of the piston rod 40. In this manner, there will be a great deal more upward force available than the downward force.

Referring now to Figure 7, there is shown a second form of tire spreader embodying the present invention. It will be apparent that this second form of tire spreader is generally similar to the form shown in Figures 1 through 6 and the parts of the second form corresponding to those of the first form bear primed reference numerals in Figure 7. The major distinction between the two forms of tire spreaders lies in the utilization of a tubular post 10′ which extends downwardly relative to the ground level or floor of the shop or other location wherein the spreader is installed, a cylindrical cavity 200 being formed in the ground to receive the lower portion of the post 10′. This arrangement serves to reduce the overhead space necessary for operation of the tire spreader inasmuch as it reduces the height to which the tire mold 122 must be elevated in order to apply it to and remove it from the tire spreader.

The various elements, their interconnection and mode of operation of this second form of tire spreader generally correspond to that of the first form of spreader described hereinbefore in conjunction with Figures 1 through 6, and except as indicated hereinafter may be taken as substantially identical thereto.

The post 10′ is rigidly affixed at its intermediate portion to a bottom hub 12′. This bottom hub 12′ is provided with spaced fingers 20′ for receiving radially extending support bars 24′. As will be clear by reference to Figure 7, however the support bars 24′ are not attached to wheeled casters. Instead, they are each rigidly affixed to a generally rectangular open-ended adjustment box 202, with the underside of these adjustment boxes resting upon the ground or floor of the shop wherein the tire spreader is installed. The adjustment boxes 202 each slidably enclose a push rod 204 which extends generally parallel to its respective support bar 24′. The inner end of each push rod 204 is pivotally attached to the lower end of one of the lower hooks 110′. The intermediate portion of each push rod is formed with a plurality of adjustment notches 206. These notches 206 are selectively engageable with a horizontally extending locking tongue 208 that extends across the interior of its respective box 202. With this arrangement, the free ends of the push rods 204 may be lifted so as to permit movement of the lower hooks 110' radially inwardly or outwardly relative to the tire to be spread so as to accommodate the tire spreader to the particular size of such tire. Thereafter, the push rods will be lowered whereby their notches 206 will be received by their respective locking tongues 208.

The sleeve member 90' is rigidly affixed at its upper end to an upper hub member 94' provided with a plurality of radially extending fingers 96. These fingers 96 carry the upper support bars 100'. It will be observed that each of the upper support bars 100' is provided with a plurality of adjustment bores 210 which extend downwardly from the upper surface of each support bar. These adjustment bores 210 correspond in spacing to the aforementioned adjustment notches 206 formed in the push rods 204. The upper hook members 114' are each selectively positioned at the desired radial spacing relative to their respective support bars 100 by means of a spring-pressed detent 220 carried by the upper hook members. This arrangement permits the radial spacing of the upper hook members to accommodate a desired diameter of tire to be spread.

It should also be noted that the lower end of the sleeve 90' is flared radially outwardly so as to define a guide 222 that assists in positioning the sleeve 90' upon the upper end of the post 10' when the sleeve and its associated mechanism is lowered over the post during a tire spreading operation.

The operation of the aforedescribed second form of tire spreader embodying the present invention may be considered substantially identical to that described in conjunction with the first form of tire spreader. In practice, the cavity 200 may be conveniently formed by means of a conventional post hole digger.

This application is a continuation-in-part of my patent application Serial No. 661,098, filed May 23, 1957, now abandoned.

Various modifications and changes may be made with respect to the foregoing detailed description without departing from the spirit of the present invention or the scope of the following claims.

I claim:

1. A reversible tire spreader including a pair of telescoping, tubular members, a piston slidably mounted in the inner telescoping member, a piston rod attached at one end to the rear of said piston and at the other end to the outer telescoping member, fluid sealing means in sealing engagement between said piston rod and the inner telescoping member and fixedly mounted in the inner telescoping member to the rear of said piston, a pressure head member in the inner telescoping member in front of said piston, means for introducing hydraulic fluid under pressure into the inner telescoping member between the front of said piston and said pressure head to extend said telescoping members, means for introducing hydraulic fluid under pressure into the inner telescoping member between the rear of said piston and said fluid sealing means to collapse said telescoping members, and tire bead engaging means mounted on each of said telescoping members for selectively engaging the respective beads of a tire.

2. The device of claim 1 in which said second hydraulic fluid pressure introducing means includes a hydraulic fluid pressure line communicating with the inside of the inner telescoping member between the rear of said piston and said fluid sealing means, said line extending longitudinally between said telescoping members so that said fluid line will not obstruct the placing of a tire over said telescoping members.

3. The device of claim 2 in which said line is recessed in a longitudinal groove in one of said telescoping members.

4. A reversible tire spreader including a pair of telescoping members, a piston slidably mounted in the inner telescoping member, a piston rod attached at one end to the rear of said piston and at the other end to the outer telescoping member, fluid sealing means in sealing engagement between said piston rod and the inner telescoping member and fixedly mounted in the inner telescoping member to the rear of said piston, a pressure head member in the inner telescoping member in front of said piston, a source of hydraulic fluid pressure, a first fluid line operatively connecting said fluid pressure source and the inside of the inner telescoping member between the front of said piston and said pressure head member to extend said telescoping members, a second fluid line operatively connecting said fluid pressure source and the inside of the inner telescoping member between the rear of said piston and said fluid sealing means to collapse said telescoping members, one of said fluid lines extending longitudinally between said telescoping members so that both of said fluid lines will extend from the same end of said telescoping members to said fluid pressure source, whereby a tire may be placed over the other end of one of the telescoping members without interference from either of said lines, and tire bead engaging means mounted on each of said telescoping members for selectively engaging the respective beads of a tire.

5. The device of claim 4 in which said fluid lines extend from the end of said telescoping members corresponding to the end of the inner telescoping member which bears said pressure head member.

6. The device of claim 4 in which the tire bead engaging means that is mounted on the telescoping member over whose end the tire is placed includes a hub mounted on that telescoping member, a plurality of radial bars removably mounted on said hub, and a plurality of tire bead engaging members slidably mounted on the respective said bars for selectively operatively engaging a bead of said tire.

7. The device of claim 4 in which said line which extends longitudinally between said telescoping members is recessed in a longitudinal groove in one of said telescoping members.

8. A reversible tire spreader including a pair of telescoping tubular members, a piston slidably mounted in the inner telescoping member, a piston rod attached at one end to the rear of said piston and at the other end to the outer telescoping member, fluid sealing means in sealing engagement between said piston rod and the inner telescoping member and fixedly mounted in the inner telescoping member to the rear of said piston, a pressure head member in the inner telescoping member in front of said piston, means for introducing hydraulic fluid under pressure into the inner telescoping member between the front of said piston and said pressure head to extend said telescoping members, means for introducing hydraulic fluid under pressure into the inner telescoping member between the rear of said piston and said fluid sealing means to collapse said telescoping members, tire bead engaging means mounted on the inner telescoping member for selectively operatively engaging one bead of a tire, a hub mounted on the outer telescoping member, a plurality of radial bars removably mounted on said hub, and a plurality of tire bead engaging members slidably mounted on the respective said bars for selectively operatively engaging the other bead of the tire.

9. A reversible tire spreader including a base, a tubular post mounted in a substantially upright position on said base, a sleeve slidably mounted over said post, a piston slidably mounted in said post and having an attached piston rod extending upwardly through said post and attached at its upper end to said sleeve, a pressure head member in said post below said piston, fluid sealing means mounted in said post above said piston to provide a fluid seal between said post and said piston rod, a source of hydraulic fluid pressure, a first fluid line operatively connecting said fluid pressure source and the inside of said post between said pressure head member and said piston to move said sleeve upwardly, a second fluid line operatively connecting said fluid pressure source and the inside of said post between said piston and said fluid sealing means to move said sleeve downwardly, and tire engaging means mounted on said post and on said sleeve for selectively engaging the respective beads of a tire.

10. The device of claim 9 in which said second fluid line extends upwardly from below said sleeve between said post and said sleeve to its said communication with the inside of said post.

11. The device of claim 10 in which said line is recessed in a longitudinal groove in the outer wall of said post.

12. The device of claim 10 in which said tire bead engaging means mounted on said sleeve includes a hub mounted on said sleeve, a plurality of radial bars removably mounted on said hub, and a plurality of tire bead engaging members slidably mounted on the respective said bars for selectively operatively engaging the upper bead of the tire.

13. The device of claim 12 in which said tire bead engaging means mounted on said post includes a hub mounted on said post, a plurality of radial bars removably mounted on said hub, and a plurality of tire bead engaging members slidably mounted on the respective said bars for selectively operatively engaging the lower bead of the tire.

14. A tire spreader including a base, a tubular post mounted in a substantially upright position on said base, a sleeve slidably mounted over said base, a piston slidably mounted in said post and having an attached piston rod extending upwardly through said post and removably attached at its upper end to said sleeve, a pressure head member in said post below said piston, a source of hydraulic fluid pressure, a fluid line operatively connecting said fluid pressure source and the inside of said post between said pressure head member and said piston to move said sleeve upwardly upon selective operation of said hydraulic fluid pressure source, tire engaging means mounted on said post and on said sleeve for selectively engaging the respective beads of the tire, and gripping means attached to said sleeve at its upper end, whereby a movable hoist may be selectively operatively engaged to said gripping means to selectively lift said sleeve off of said post and move said sleeve over a tire which can then be engaged by said tire engaging means on said sleeve, the sleeve and tire then being placed over said post to a position in which said tire engaging means on said post can be engaged with the other bead of the tire.

15. The apparatus of claim 14 in which fluid sealing means is provided in said post above said piston to provide a fluid seal between said post and said piston rod, and in which a second fluid line operatively connects said fluid pressure source and the inside of said post between said piston and said fluid sealing means to selectively move said sleeve downwardly.

16. A reversible tire spreader, comprising: a base that rests upon the ground or a floor; a vertical post secured at its intermediate portion to said base with its lower portion extending downwardly below the ground or floor level of said base, a sleeve slidably mounted over the upper portion of said post, a piston slidably mounted in said post and having an attached piston rod extending upwardly through said post and attached at its upper end to said sleeve, a pressure head member in said post below said piston, fluid sealing means mounted in said post above said piston to provide a fluid seal between said post and said piston rod, a source of hydraulic fluid pressure, a first fluid line operatively connecting said fluid pressure source and the inside of said post between said pressure head member and said piston to move said sleeve upwardly, a second fluid line operatively connecting said fluid pressure source and the inside of said post between said piston and said fluid sealing means to move said sleeve downwardly, and tire engaging means mounted on said post and on said sleeve for selectively engaging the respective beads of a tire.

17. The device of claim 16 in which said second fluid line extends upwardly from below said sleeve between said post and said sleeve to its said communication with the inside of said post.

18. The device of claim 17 in which said line is recessed in a longitudinal groove in one of said post and sleeve members.

19. The device of claim 17 in which said tire bead engaging means mounted on said sleeve includes a hub mounted on said sleeve, a plurality of radial bars removably mounted on said hub, and a plurality of tire bead engaging members slidably mounted on the respective said bars for selectively operatively engaging the upper bead of the tire.

20. The device of claim 19 in which said tire bead engaging means mounted on said post includes a hub mounted on said post, a plurality of radial bars removably mounted on said hub, and a plurality of tire bead engaging members slidably mounted on the respective said bars for selectively operatively engaging the lower bead of the tire.

21. A reversible tire spreader, comprising: a base that rests upon the ground or a floor; a vertical post secured at its intermediate portion to said base with its lower portion extending downwardly below the ground or floor level of said base, a sleeve slidably mounted over the upper portion of said post, a piston slidably mounted in said post and having an attached piston rod extending upwardly through said post and removably attached at its upper end to said sleeve, a pressure head member in said post below said piston, a source of hydraulic fluid pressure, a fluid line operatively connecting said fluid pressure source and the inside of said post between said pressure head member and said piston to move said sleeve upwardly upon selective operation of said hydraulic fluid pressure source, tire engaging means mounted on said post and on said sleeve for selectively engaging the respective beads of the tire, and gripping means attached to said sleeve at its upper end, whereby a movable hoist may be selectively operatively engaged to said gripping means to selectively lift said sleeve off of said post and move said sleeve over a tire which can then be engaged by said tire engaging means on said sleeve, the sleeve and tire then being placed over said post to a position in which said tire engaging means on said post can be engaged with the other bead of the tire.

22. The apparatus of claim 21 in which fluid sealing means is provided in said post above said piston to provide a fluid seal between said post and said piston rod, and in which a second fluid line operatively connects said fluid pressure source and the inside of said post between said piston and said fluid sealing means to selectively move said sleeve downwardly.

23. The apparatus of claim 21 wherein the lower end of said sleeve is formed with a radially outwardly flared guide to facilitate movement of said sleeve onto said post.

24. A reversible tire spreader including a pair of telescoping, tubular members, a piston slidably mounted in the inner telescoping member, a piston rod attached at one end to the rear of said piston and at the other end to the outer telescoping member, fluid sealing means in sealing engagement between said piston rod and the inner telescoping member and fixedly mounted in the inner telescoping member to the rear of said piston, a pressure head member in the inner telescoping member in front of said piston, means for introducing hydraulic fluid under pressure into the inner telescoping member between the front of said piston and said pressure head to extend said telescoping members, means for introducing hydraulic fluid under pressure into the inner telescoping member between the rear of said piston and said fluid sealing means to collapse said telescoping members, tire bead engaging means mounted on each of said telescoping members for selectively engaging the respective beads of a tire, gripping means on said outer telescoping member, with said telescoping members being relatively disengageable whereby a hoist may be selectively operatively engaged with said gripping means to selectively lift said outer telescoping member off said inner telescoping member, and a radially outwardly flared guide on the lower end of said outer telescoping member.

25. The device of claim 24 in which said second hydraulic fluid pressure introducing means includes a hydraulic fluid pressure line communicating with the inside of the inner telescoping member between the rear of said piston and said fluid sealing means, said line extending longitudinally between said telescoping members so that said fluid line will not obstruct the placing of a tire over said telescoping members.

References Cited in the file of this patent
UNITED STATES PATENTS

| | | |
|---|---|---|
| 1,908,311 | Branick | May 9, 1933 |
| 2,250,740 | Anderson | July 29, 1941 |
| 2,402,430 | Mooney et al. | June 18, 1946 |
| 2,445,701 | Vogt | July 20, 1948 |
| 2,477,858 | Brabbin | Aug. 2, 1949 |